United States Patent
Lim et al.

(10) Patent No.: US 11,081,242 B2
(45) Date of Patent: Aug. 3, 2021

(54) COOLANT TANK, AND PASSIVE CONTAINMENT COOLING SYSTEM COMPRISING SAME

(71) Applicant: KOREA HYDRO & NUCLEAR POWER CO., LTD, Gyeongsangbuk-do (KR)

(72) Inventors: Sang Gyu Lim, Daejeon (KR); Dae Hun Kim, Sejong (KR); Hui Un Ha, Daejeon (KR); Han Gon Kim, Daejeon (KR); Sang Won Lee, Daejeon (KR); Sun Heo, Daejeon (KR); Jong Cheon, Daejeon (KR)

(73) Assignee: Korea Hydro & Nuclear Power Co., LTD., Gyeongsangbuk-do (KR)

( * ) Notice: Subject to any disclaimer, the term of this patent is extended or adjusted under 35 U.S.C. 154(b) by 216 days.

(21) Appl. No.: 16/338,247

(22) PCT Filed: Sep. 28, 2017

(86) PCT No.: PCT/KR2017/010875
§ 371 (c)(1),
(2) Date: Mar. 29, 2019

(87) PCT Pub. No.: WO2018/062916
PCT Pub. Date: Apr. 5, 2018

(65) Prior Publication Data
US 2019/0237207 A1 Aug. 1, 2019

(30) Foreign Application Priority Data

Sep. 30, 2016 (KR) .................. 10-2016-0126859
Sep. 30, 2016 (KR) .................. 10-2016-0126864

(51) Int. Cl.
*G21C 15/18* (2006.01)
*G21D 3/04* (2006.01)
*G21C 9/012* (2006.01)

(52) U.S. Cl.
CPC ............. *G21C 15/18* (2013.01); *G21C 9/012* (2013.01); *G21D 3/04* (2013.01); *Y02E 30/30* (2013.01)

(58) Field of Classification Search
CPC ........ G21C 15/18; G21C 9/012; G21C 13/02; G21D 3/04; Y02E 30/30
See application file for complete search history.

(56) References Cited

U.S. PATENT DOCUMENTS 5,295,169 A * 3/1994 Tominaga ............ G21C 15/18
376/293
9,761,333 B2 * 9/2017 Lee ........................ G21C 15/18
(Continued)

FOREIGN PATENT DOCUMENTS

GB 2531840 A 5/2016
JP 06242279 9/1994
(Continued)

*Primary Examiner* — Darlene M Ritchie
(74) *Attorney, Agent, or Firm* — Occhiuti & Rohlicek LLP (57) ABSTRACT

In order to provide a coolant tank for preventing a containment from being recompressed and reheated during the cooling of the containment upon occurrence of a design basis accident and a severe accident and a passive containment cooling system comprising the same, the present invention comprises: a storage tank for storing a coolant; a division part which is arranged within the storage tank and divides the inside of the storage tank into a first storage tank and a second storage tank to separate the coolant; a first heat exchanger which is extended from the storage tank to the containment and cools the containment on the basis of the coolant; and a unidirectional valve which is provided on the (Continued)

division part and allows the coolant of the second storage tank to be introduced into the first storage tank when the water level of the first storage tank is reduced.

9 Claims, 8 Drawing Sheets

(56) References Cited

U.S. PATENT DOCUMENTS

| | | | |
|---|---|---|---|
| 10,319,481 B2 * | 6/2019 | Kim | .......................... G21D 3/06 |
| 2009/0116607 A1 * | 5/2009 | Song | ....................... G21C 9/016 |
| | | | 376/280 |
| 2014/0016734 A1 | 1/2014 | Moon et al. | |
| 2016/0247585 A1 | 8/2016 | Han et al. | |
| 2018/0233240 A1 * | 8/2018 | Kim | ....................... G21C 15/26 |

FOREIGN PATENT DOCUMENTS

| | | | | |
|---|---|---|---|---|
| JP | 06258491 | | 9/1994 | |
| JP | 08005772 | | 1/1996 | |
| JP | H085882 A | | 1/1996 | |
| JP | 2012198168 A | | 10/2012 | |
| KR | 20120094726 A | * | 8/2012 | .............. F25B 30/06 |
| KR | 101389276 | | 4/2014 | |
| KR | 101528223 | | 6/2015 | |
| KR | 101659864 | | 9/2016 | |

\* cited by examiner

PRIOR ART

COOLANT TANK, AND PASSIVE CONTAINMENT COOLING SYSTEM COMPRISING SAME

This application is a National Phase under 35 U.S.C. 371 of International Application No. PCT/KR2017/010875 filed on Sep. 28, 2017, which claims priority to Korean Application No. 10-2016-0126859 filed on Sep. 30, 2016 and Korean Application No. 10-2016-0126864 filed on Sep. 30, 2016.

TECHNICAL FIELD

The present invention relates to a cooling water storage reservoir and a nuclear reactor building passive cooling system including the same, and more particularly, to a cooling water storage reservoir for cooling a nuclear reactor building and a nuclear reactor building passive cooling system including the same.

BACKGROUND ART

In general, in the case of a design basis accident and severe at a nuclear power plant, a radioactive material is discharged together with steam into the nuclear reactor building and thus a temperature and pressure in the nuclear reactor building rise sharply. In this case, when the rising temperature and pressure are not controlled, the nuclear reactor building may be destroyed. Therefore, a nuclear reactor building cooling system is provided in the nuclear reactor building and thus in case of a design basis accident and a major accident, the rising temperature and pressure may be adjusted.

However, in the case of a design basis accident and severe accident, it is difficult for an operator to access to control the cooling system, and there is a problem that the cooling system does not operate properly due to a loss of offside power. Therefore, a passive cooling system is applied. The passive cooling system may include a cooling water storage reservoir installed outside the nuclear reactor building and a heat exchanger extended from the cooling water storage reservoir into the nuclear reactor building.

Therefore, in the case of a design basis accident and severe accident, as the heat exchanger passively operates, the nuclear reactor building is cooled. Here, at the beginning of the accident, thermal energy is smoothly removed by a low temperature of cooling water.

However, when a temperature of cooling water rises due to repeated heat exchange, thermal energy may not be completely removed and thus there is a problem that a temperature and pressure of the nuclear reactor building rise again.

DISCLOSURE

Technical Problem

The present invention provides a cooling water storage reservoir, and a nuclear reactor building passive cooling system including the same, the reservoir capable of preventing re-pressurization and reheating of a nuclear reactor building from the cooling of a nuclear reactor building in the case of a design basis accident and severe accident.

Technical Solution

A nuclear reactor building passive cooling system according to the present invention is disposed adjacent to an outer wall of a nuclear reactor building and capable of passively cooling the nuclear reactor building, and the system includes: a storage tank storing cooling water; a partition part arranged within the storage tank and dividing inside of the storage tank into a first storage tank and a second storage tank to separate the cooling water; a first heat exchanger extending from the storage tank to the nuclear reactor building and cooling the nuclear reactor building on the basis of the cooling water; and a unidirectional valve provided on the partition part and allowing the cooling water of the second storage tank to flow into the first storage tank when a water level of the first storage tank is reduced.

The system may further include a second heat exchanger extending from the first storage tank to outside of the storage tank to cool the cooling water of the first storage tank. The system may further include an air inlet part provided on an outer surface of the storage tank to induce air to flow into the second heat exchanger.

The air inlet part may be disposed to surround the second heat exchanger and provided in a tube shape having an open top.

The air inlet part may be provided in a venturi tube shape having an open top.

The unidirectional valve may include at least one of a floating valve or a check valve.

The first heat exchanger may include: an inlet pipe into which the cooling water is introduced from the second storage tank, an outlet pipe along which the cooling water provided from the inlet pipe into the first storage tank; and a heat exchange unit disposed between the inlet pipe and the outlet pipe.

The first heat exchanger may include: an inlet pipe into which the cooling water is introduced from the first storage tank, an outlet pipe along which the cooling water provided from the inlet pipe returns back to the first storage tank, and a heat exchange unit disposed between the inlet pipe and the outlet pipe.

A capacity of the first storage tank may be smaller than a capacity of the second storage tank.

Meanwhile, a cooling water storage reservoir according to the present invention is capable of passively cooling a building and includes: a storage tank storing cooling water; a partition part arranged within the storage tank and dividing inside of the storage tank into a first storage tank and a second storage tank to separate the cooling water; a first heat exchanger extending from the storage tank to the building and cooling the nuclear building on the basis of the cooling water; and a unidirectional valve provided on the partition part and allowing the cooling water of the second storage tank to flow into the first storage tank when the water level of the first storage tank is reduced.

Advantageous Effects

A cooling water storage reservoir and a nuclear reactor building passive cooling system including the same according to the present invention can quickly stabilize a performance of the nuclear reactor building passive cooling system, thereby preventing performance deterioration of the nuclear reactor building passive cooling system.

Further, a cooling water storage reservoir and a nuclear reactor building passive cooling system including the same according to the present invention can continuously reduce a pressure and temperature of the nuclear reactor building, thereby suppressing occurrence of a secondary accident such as destruction of the nuclear reactor building.

The technical effects of the present invention are not limited to the effects mentioned above, and other technical effects not mentioned can be clearly understood by those skilled in the art from the following description.

MODE FOR INVENTION

Hereinafter, an embodiment according to the present invention will be described in detail with reference to the attached drawings. However, it should be understood that the present embodiment is not limited to embodiments described hereinafter, but may be implemented in various forms, and the present embodiments enable to complete the disclosure of the present invention and are provided to know completely the scope of the invention to those skilled in the art. In the drawing, shapes of elements may be exaggeratingly expressed for better description, and like reference numerals designate like elements in the drawing.

Figure 1:
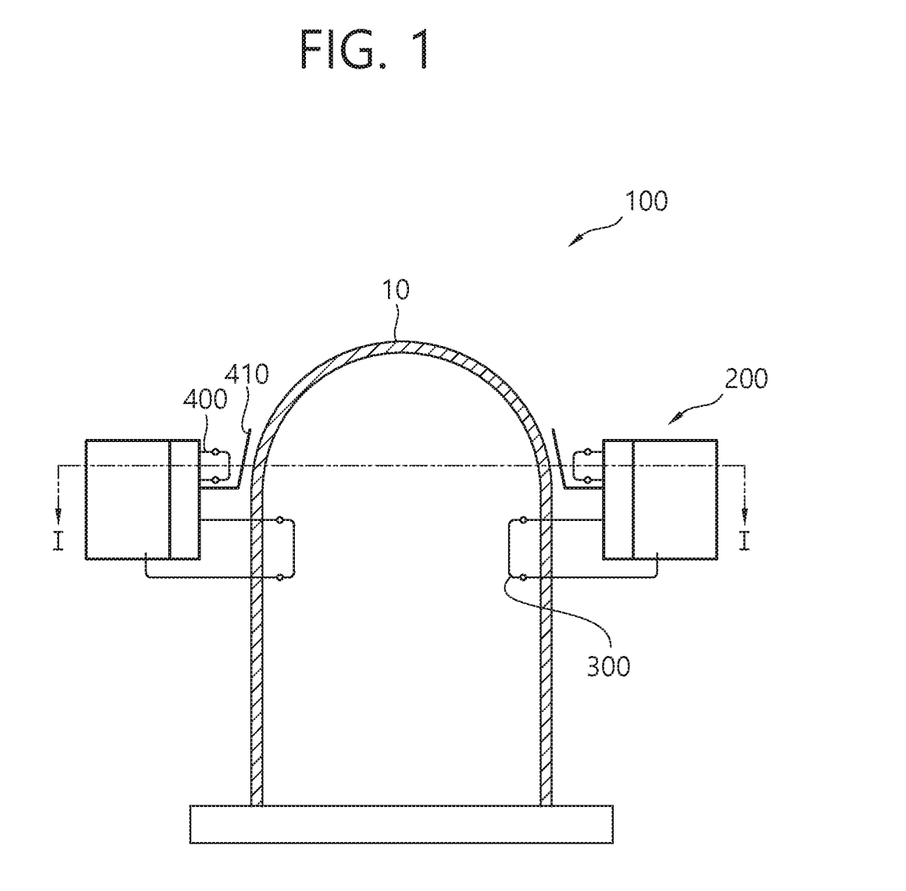
FIG. 1 is a conceptual view schematically illustrating a nuclear reactor building passive cooling system according to the present embodiment.
Figure 2:
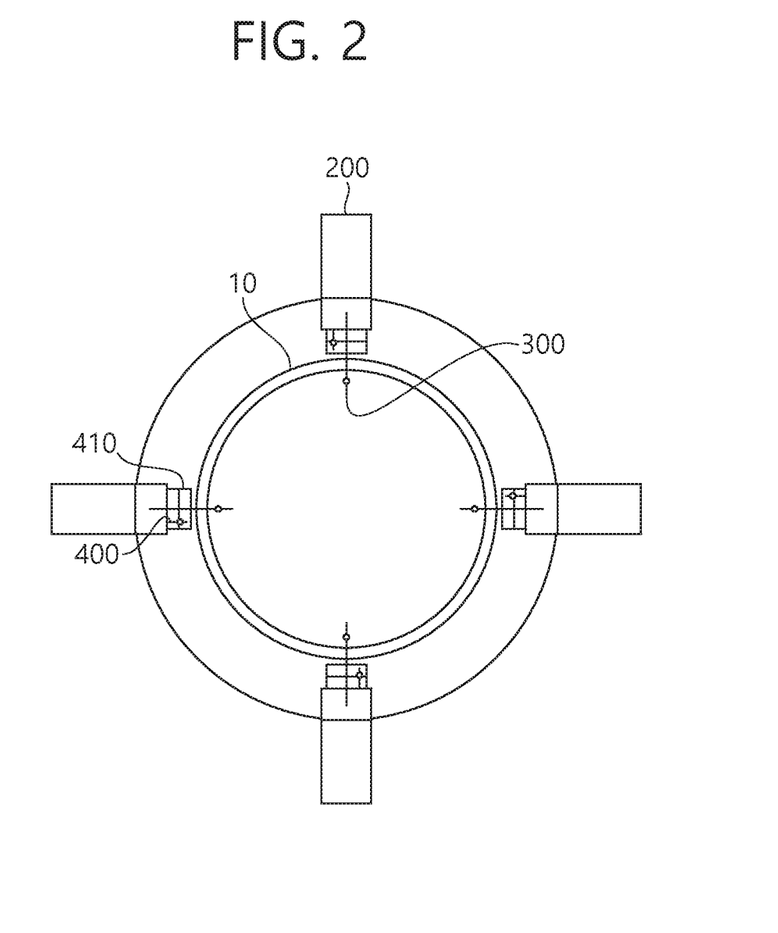
FIG. 2 is a cross-sectional view illustrating a nuclear reactor building passive cooling system according to the present embodiment taken along line I-I' of FIG. 1.

As shown in FIGS. 1 and 2, a nuclear reactor building passive cooling system 100 (hereinafter, referred to as a cooling system) according to the present embodiment includes a cooling water storage reservoir 200.

The cooling water storage reservoir 200 may be disposed in an upper area of an outer circumference of a nuclear reactor building 10. The cooling water storage reservoir 200 may supply cooling water to the inside of the nuclear reactor building 10, as needed, and in this case, even if main power of a reactor facility is loss, the cooling water storage reservoir 200 may be disposed in an upper area of the nuclear reactor building 10 so as to supply cooling water by gravity. However, when it is necessary to adjust a supply cooling water flow to the nuclear reactor building 10, the height of the cooling water storage reservoir 200 may be changed.

The cooling water storage reservoir 200 may be disposed in the plural, FIG. 2 illustrates an embodiment in which four cooling water storage reservoir 200 are provided, and the number of the cooling water storage reservoir 200 is not limited thereto.

Meanwhile, a first heat exchanger 300 is connected to the cooling water storage reservoir 200. One side of the first heat exchanger 300 is disposed inside the cooling water storage reservoir 200, and the other side thereof extends into the inside of the nuclear reactor building 10 so that the nuclear reactor building 10 is cooled by cooling water contained in the cooling water storage reservoir 200. The first heat exchanger 300 will be described in more details with reference to the accompanying drawings.

Meanwhile, the cooling water contained in the cooling water storage reservoir 200 may be contained while partitioned inside the cooling water storage reservoir 200. Hereinafter, the cooling water storage reservoir 200 according to the present embodiment will be described in more details with reference to the accompanying drawings. However, description about elements mentioned above will be omitted, and like reference numerals refer to like elements.

Figure 3:
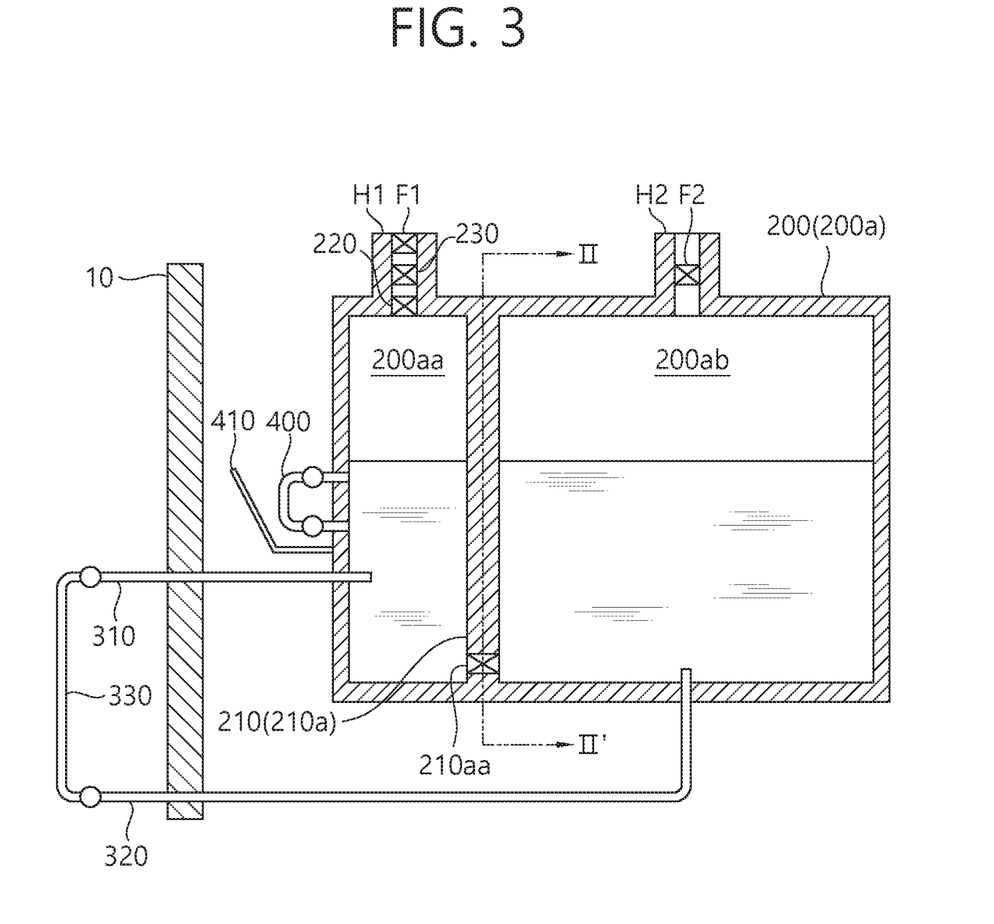
FIG. 3 is a cross-sectional view schematically illustrating a cooling water storage reservoir of a nuclear reactor building passive cooling system according to the present embodiment.
Figure 4:
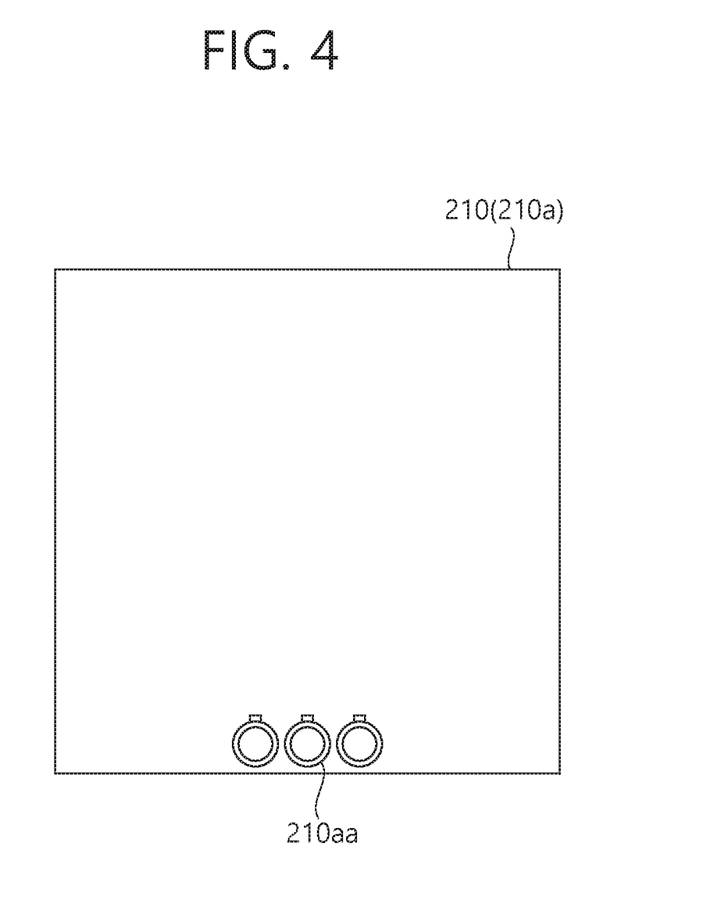
FIG. 4 is a cross-sectional view illustrating a cooling water storage reservoir of a nuclear reactor building passive cooling system according to the present embodiment taken along line II-II' of FIG. 1.

FIG. 3 is a cross-sectional view schematically illustrating a cooling water storage reservoir of a nuclear reactor building passive cooling system according to the present embodiment, and FIG. 4 is a cross-sectional view illustrating a cooling water storage reservoir of a nuclear reactor building passive cooling system according to the present embodiment taken along line II-II' of FIG. 3.

As shown in FIGS. 3 and 4, the cooling water storage reservoir 200 according to the present embodiment includes a storage tank 200a. The storage tank 200a may form an outer shape of the cooling water storage reservoir 200 and may be supported to an outer wall of the nuclear reactor building 10. Here, the storage tank 200a forms a space for receiving cooling water therein and may be provided in a substantially cubic shape, but a shape of the storage tank 200a is not limited thereto.

At the inside of the storage tank 200a, a partition part 210 for partitioning a receiving space of the cooling water is provided. The partition part 210 may be provided as a partition 210a. The partition 210a disposed between an upper wall and a lower wall of the storage tank 200a forms a first storage tank 200aa adjacent to the nuclear reactor building 10 and a second storage tank 200ab separated from the first storage tank 200aa.

In this case, a capacity of the second storage tank 200ab may be set to be greater than a capacity of the first storage tank 200aa. For example, the capacity of the first storage tank 200aa may be equal to or less than 50% of the total capacity of the storage tank 200a.

In addition, the first heat exchanger 300 is connected to the first storage tank 200aa and the second storage tank 200ab. The first heat exchanger 300 may include a outlet pipe 310 connected to the first storage tank 200aa, an inlet pipe 320 connected to the second storage tank 200ab, and a heat exchange unit 330 disposed between the outlet pipe 310 and the inlet pipe 320. Accordingly, the first heat exchanger 300 may circulate cooling water in the second storage tank 200ab in a direction toward the first storage tank 200aa, thereby cooling the nuclear reactor building 10.

Figure 8:
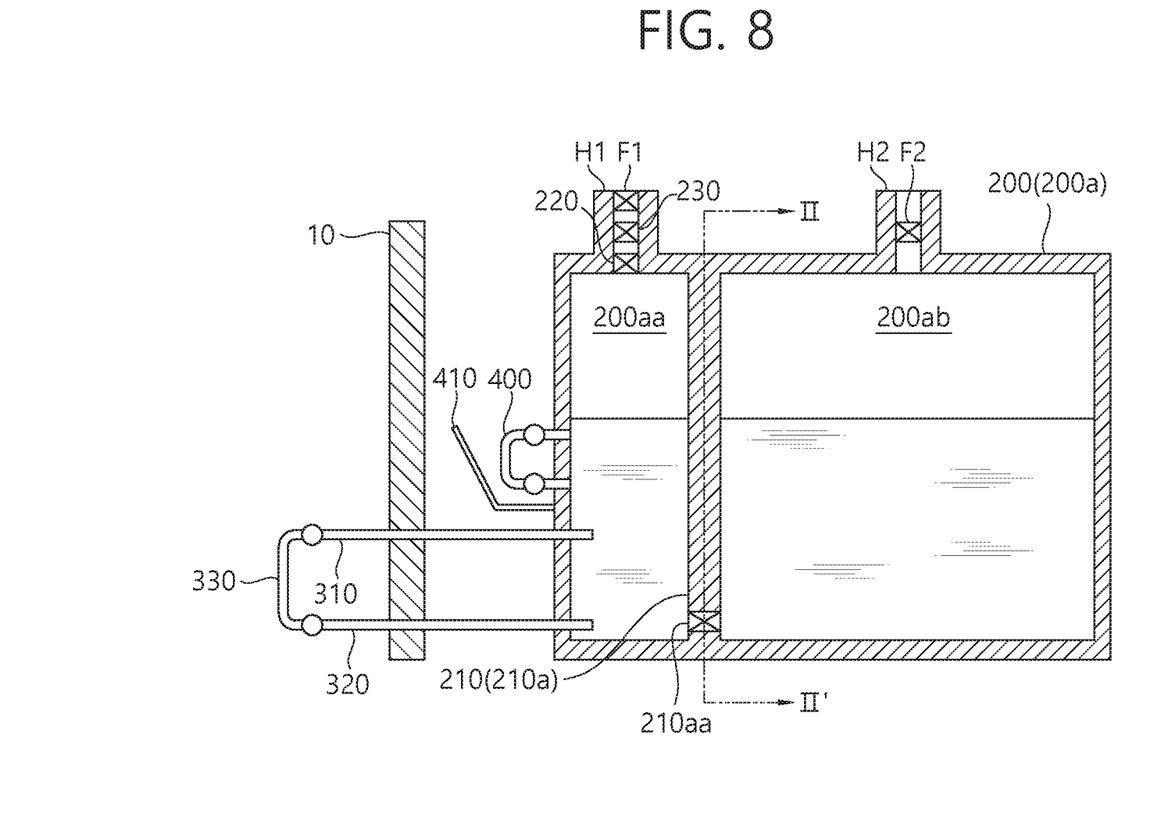
FIG. 8 is a cross-sectional view schematically illustrating a cooling water storage reservoir of a nuclear reactor building passive cooling system according to another embodiment.

However, the present embodiments described an example in which the outlet pipe 310 and the inlet pipe 320 of the first heat exchanger 300 are respectively connected to the first storage tank 200aa and the second storage tank 200ab. However, this is merely an example of the present embodiment, and the outlet pipe 310 and the inlet pipe 320 of the first heat exchanger 300 extends to the inside of the first storage tank 200aa, as shown in FIG. 8.

A steam outlet H1 is formed in an upper wall of the first storage tank 200aa. The steam outlet H1 enables steam generating by heating cooling water of the first storage tank 200aa when cooling the nuclear reactor building 10 to be discharged to the outside. Therefore, the storage tank 200a can be prevented from being broken or damaged due to a change in an internal pressure.

In addition, a water level reduction delay unit 220 may be installed in a steam discharge port H1 may be disposed. The water level reduction delay unit 220 separates droplets and moisture from steam discharged from the first storage 200aa to the outside so that the separated moisture returns to the first storage tank 200aa.

The water level reduction delay unit 220 may be provided as a moisture separator, and may delay cooling water level reduction in the storage tank 200a so as to enable passive cooling of the nuclear reactor building 10 for a long time.

In addition, a passive alarm unit 230 may be installed above the water level delay unit 220. In the case of a design basis accident and severe accident, the passive alarm unit 230 may give an alarm to perform cooling of the nuclear reactor building 10. When vapor is introduced into the steam discharging port H1, the passive alarm unit 230 may generate an alarm or turn on alarm lamp based on vapor flow.

For example, the passive alarm unit 230 may be provided as a sound alarm device capable of generating noise in response to occurrence of pressure, or as an emergency lamp alarm device configured to turn on an emergency warning lamp by a self power generator such as a propeller which rotates in accordance with vapor flow.

However, this is merely an example of the present embodiment, and the passive alarm unit 230 may be implemented as any of various configurations capable of passively providing an alarm even without power supplied from the outside.

When a design basis accident or severe accident occurs, the passive alarm unit 230 may alarm an operation of cooling the nuclear reactor building 10 so as to primarily inform the surroundings of the occurrence of the accident, and may later on notify whether pressure of the nuclear reactor building 10 is increased or decreased.

A pressure regulator H2 is formed in an upper wall of the second storage tank 200ab. The pressure regulator H2 maintains an internal pressure of the second storage tank 200ab to be equal to an external atmospheric pressure irrespective of an internal pressure of the first storage tank 200aa.

Filters F1 and F1 are mounted in the steam outlet H1 and the pressure regulator H2, respectively. When the first heat exchanger 300 is broken or damaged, the filters F1 and F2 prevent harmful substances, for example, radioactive materials that may be entered from the inside of the nuclear reactor building 10 into the storage tank 200a from being discharged to outer air.

Meanwhile, an inlet connecting the first storage tank 200aa and the second storage tank 200ab may be provided in a lower portion of the partition 210a. The inlet may be provided as a unidirectional valve 210aa. The unidirectional valve 210aa allows cooling water in the side of the second storage tank 200ab to flow to the side of the first storage tank 200aa, and prevents cooling water in the first storage tank 200aa from flowing into the second storage tank 200ab.

The unidirectional valve 210aa may be provided as a floating valve or a check valve, and may be provided as a plurality of unidirectional valves installed on the partition 210a.

However, when the unidirectional valve 210aa is provided as a plurality of unidirectional valves, the plurality of unidirectional valves may be arranged at the same height, and, although FIG. 4 shows that three unidirectional valves 210aa are provided, the number of unidirectional valves 210aa is not limited.

The unidirectional valve 210aa forms a path that may enable cooling water received in the second storage tank to enter into the first storage tank 200aa.

More specifically, in the case of a design basis accident and severe accident, the first storage tank 200aa connected to the outlet pipe 310 quickly reaches a saturation temperature. This contributes to stabilization of a heat removal performance of the cooling system 100 and thus a temperature and pressure of the nuclear reactor building 10 are quickly stabilized. The reason why a capacity of the first storage tank 200aa is smaller than that of the second storage tank 200ab as described above is intended to achieve such an effect.

Thereafter, the first storage tank 200aa reaches a saturation temperature, and cooling water received in the first storage tank 200aa is heated and discharged to the outside through the steam outlet H1. Therefore, a water level difference occurs between the first storage tank 200aa and the second storage tank 200ab. Therefore, cooling water in the second storage tank 200ab is entered into the first storage tank 200aa through the unidirectional valve 210aa so as to eliminate the water level difference.

Accordingly, the cooling water storage reservoir 200 constantly maintains a heat removal performance of the cooling system 100 from the beginning of the case of a design basis accident and severe accident to enable a pressure and temperature of the nuclear reactor building 10 to gradually reduce. Therefore, in a conventional cooling system, while a temperature and pressure of the nuclear reactor building 10 decrease, a heat removal performance decreases due to increase of the cooling water temperature and a problem can be solved that the pressure and temperature of the nuclear reactor building 10 is thus re-pressurized and reheated.

More specifically, the conventional cooling system and the cooling system 100 according to the present embodiment are compared as follows.

Figure 5:
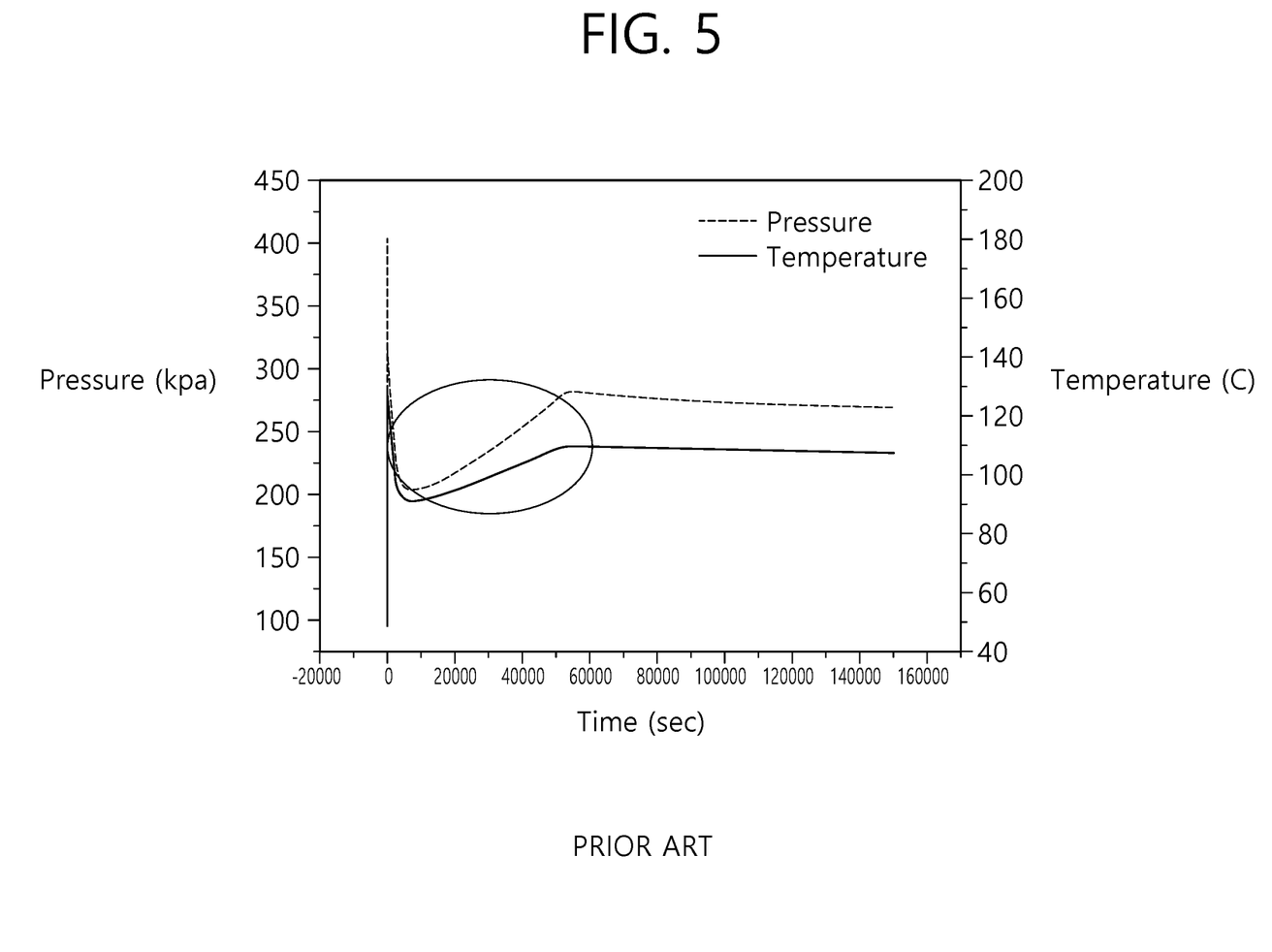
FIG. 5 is a graph illustrating changers in an internal pressure and temperature of a nuclear reactor budding according to use of a cooling water storage reservoir of a conventional passive cooling system.
Figure 6:
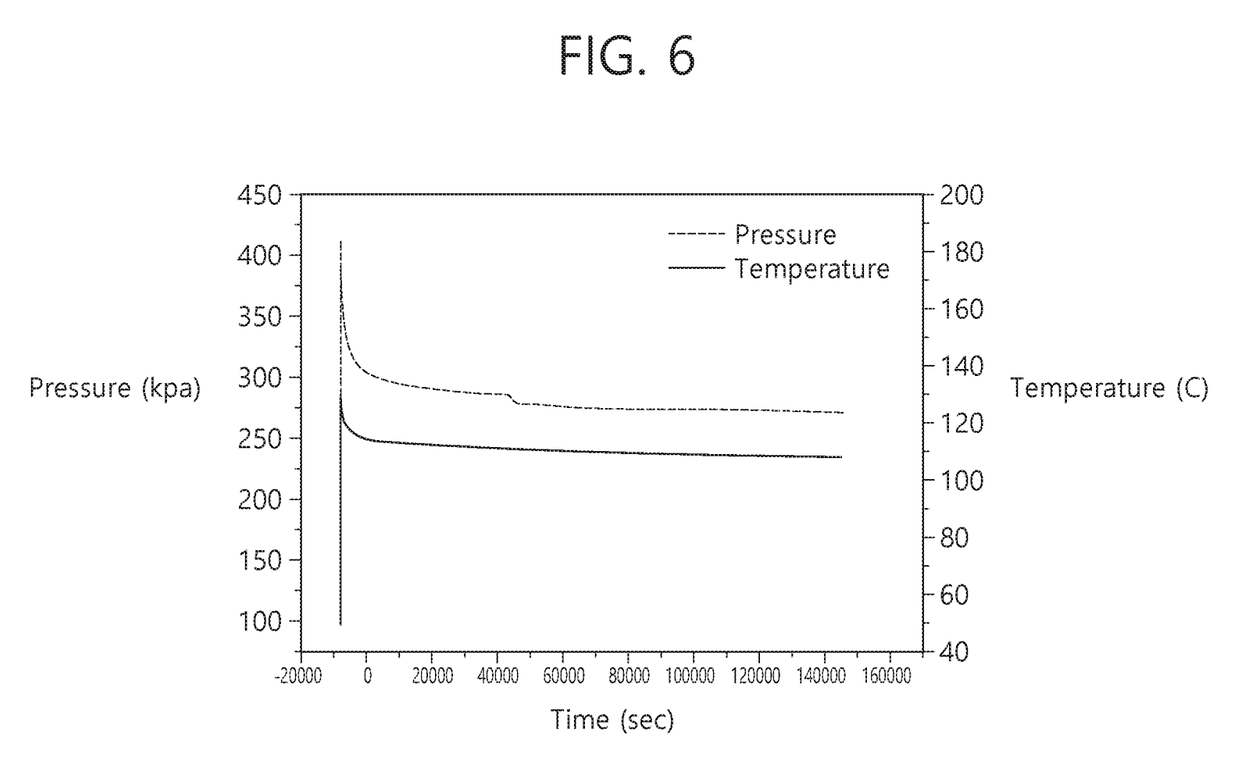
FIG. 6 is a graph illustrating changes in an internal pressure and temperature of a nuclear reactor building according to use of a cooling water storage reservoir of a nuclear reactor building passive cooling system according to the present embodiment.

As shown in FIGS. 5 and 6, a conventional cooling system operates with temperature and pressure rise of the nuclear reactor building 10 in the event of a cooling water spill accident. In this case, the conventional cooling system may reduce a temperature and pressure of the nuclear reactor building 10.

However, in an existing cooling system, efficiency of the cooling system 100 is significantly reduced as cooing water is heated after a predetermined time passes. Thus, as shown in section "A" indicated in FIG. 5, there is a problem that temperature and pressure of the nuclear reactor building 10 are increased again. In particular, in a section where temperature and pressure of the nuclear reactor building 10 are increased again for a long time, there is a possibility that a reactor operator takes a wrong action to secure an additional cooling means in order to prevent the re-pressure of the nuclear reactor building 10.

However, in the cooling system 100 according to the present embodiment, even if cooling water stored in the first storage tank 200aa is heated, cooling water received in the second storage tank 200*ab* is naturally entered into the first storage tank 200*aa* according to steam discharged to outside air. Accordingly, as shown in FIG. 6, a temperature and pressure of the nuclear reactor building 10 are reduced smoothly in the case of a design basis accident and severe accident, and a problem that the temperature and pressure of the nuclear reactor building 10 rise again is resolved.

Meanwhile, again referring to FIGS. 3 and 4, in the cooling system 100 according to the present embodiment, the inlet pipe 320 having an orifice mounted thereto may be connected to the second storage tank 200*ab* (see FIG. 3), and the unidirectional valve 210*aa* may be installed to the partition part 210. In this case, since cooling water is prevented from flowing from the first storage tank 200*aa* to the second storage tank 200*ab*, relatively cold cooling water is constantly introduced to the heat exchanger 300, and therefore, overall heat removal performance may improve further.

In addition, a second heat exchanger 400 may be connected to the first storage tank 200*aa*. An inlet pipe and an outlet pipe of the second heat exchanger 400 extend from the outside of the storage tank 200*a* into the first storage tank 200*aa*. The second heat exchanger 400 cools cooling water of the first storage tank 200*aa* through atmosphere. Accordingly, the second heat exchanger 400 may be provided as an air-cooled heat exchanger, and may improve cooling performance of the first heat exchanger 300 by cooling the cooling water of the first storage tank 200*aa*.

An air inlet part 410 may be provided. In an outer wall of the storage tank 200*aa*. The air inlet part 410 may be disposed to surround the second heat exchanger 400 and may be open at the top. In this case, the air inlet part 410 may induce air to flow into the second heat exchanger 400, thereby improving heat transfer performance of the second heat exchanger 400 that can be provided as an air-cooled heat exchanger.

The air inlet part 410 is provided for Venturi effect, and may have a shape of a Venturi pipe having an open top, but the shape of the air inlet part 400 is not limited.

Hereinafter, an operation of a nuclear reactor building passive cooling system according to the present embodiment will be described in more detail. However, a detailed description of the above-described constituent elements is omitted and constituent elements identical to or corresponding to those according to the foregoing embodiment are denoted by the same reference numerals.

Figure 7:
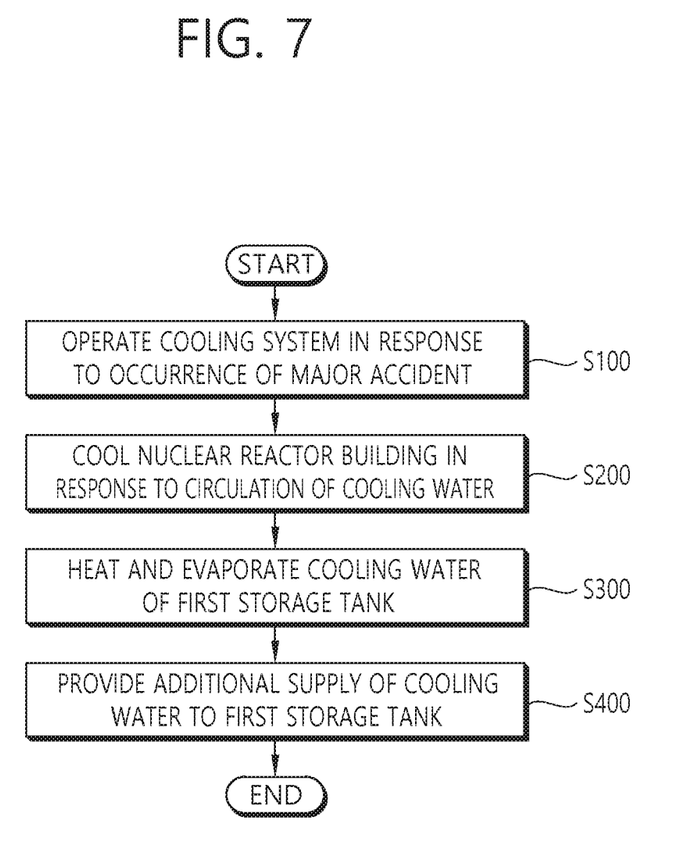
FIG. 7 is a flowchart illustrating an operation of a nuclear reactor building passive cooling system according to the present embodiment.

FIG. 7 is a flowchart illustrating an operation of a nuclear reactor building passive cooling system according to the present embodiment.

As shown in FIG. 7, the cooling system 100 according to the present embodiment may be operated in the case of a design basis accident and severe accident (S100). In this case, steam and radioactive materials are discharged from inside the nuclear reactor building 10, thereby increasing a temperature and pressure of an inner space of the nuclear reactor building 10.

Therefore, cooling water in the heat exchange unit 330 is heated, and the heated cooling water is entered into the first storage tank 200*aa*. In this case, the cooling water received in the second storage tank 200*ab* is entered into the first heat exchanger 300 to be provided to the heat exchange unit 330. In this manner, the cooling system 100 repeats inflow and outflow and circulates cooling water based on a natural force (S200).

After an accident occurs, as a time has elapsed, a temperature of cooling water in the first storage tank 200*aa* rises to a boiling point (S300). However, in a state in which cooling water stored in the second storage tank 200*ab* is not mixed with the cooling water in the first storage tank 200*aa*, the cooling water stored in the second storage tank 200*ab* maintains an initial temperature.

Further, a time at which cooling water in the first storage tank 200*aa* reaches a boiling point becomes shorter than that of a conventional cooling water storage reservoir having the same capacity as that of the cooling water storage reservoir 200 according to the present embodiment. Therefore, the cooling system 100 according to the present embodiment is stabilized through a relatively short transient period.

Further, as cooling water of the first storage tank 200*aa* evaporates, cooling water of a low temperature of the second storage tank 200*ab* is naturally entered into the first storage tank 200*aa* (S400). Accordingly, a heat removal performance of the cooling system 100 is lowered due to increase in a temperature of cooling water stored in the first storage tank 200*aa*, thereby solving a problem that a pressure and temperature of the nuclear reactor building 10 are re-pressurized and reheated.

In addition, temperature increases faster in the first storage tank 200*aa* than in the second storage tank 200*ab*, and, as the second heat exchanger 400 is provided, heat in the first storage tank 200*aa* may be constantly removed by atmosphere. As a result, there is an advantage in increasing a total heat removal amount of the cooling system 100. In addition, if the Venturi shape applies to the air inlet part 410, air cooling performance may further improve.

Therefore, a cooling water storage reservoir and a nuclear reactor building passive cooling system including the same can quickly stabilize a performance of the nuclear reactor building passive cooling system, thereby preventing performance deterioration of the nuclear reactor building passive cooling system.

Further, the cooling water storage reservoir and the nuclear reactor building passive cooling system including the same can continuously reduce a pressure and temperature of the nuclear reactor building, and thus a secondary accident such as destruction of the nuclear reactor building can be suppressed from occurring.

The embodiments of the present invention described above and shown in the drawings should not be construed as limiting the technical idea of the present invention. The scope of the present invention is limited only by the matters described in the claims, and those skilled in the art can modify the technical idea of the present invention in various forms. Accordingly, such improvements and modifications will fall within the scope of the present invention as long as they are obvious to those skilled in the art.

The invention claimed is:

1. A nuclear reactor building passive cooling system disposed adjacent to an outer wall of a nuclear reactor building and capable of passively cooling the nuclear reactor building, the system comprising:
   a storage tank storing cooling water;
   a partition part arranged within the storage tank and dividing an inside of the storage tank into a first storage tank and a second storage tank to separate the cooling water;
   a first heat exchanger extending from the storage tank to the nuclear reactor building and cooling the nuclear reactor building on the basis of the cooling water;
   a unidirectional valve provided on the partition part and allowing the cooling water of the second storage tank to be introduced into the first storage tank when a water level of the first storage tank is reduced; and wherein the first heat exchanger comprises an inlet pipe into which the cooling water is introduced from the second storage tank, an outlet pipe along which the cooling water provided from the inlet pipe returns back into the first storage tank; and a heat exchange unit disposed between the inlet pipe and the outlet pipe.

2. The system of claim 1, wherein the unidirectional valve comprises at least one of a floating valve or a check valve.

3. The system of claim 1, wherein the first heat exchanger comprises an inlet pipe into which the cooling water is introduced from the first storage tank, an outlet pipe along which the cooling water provided from the inlet pipe returns back to the first storage tank, and a heat exchange unit disposed between the inlet pipe and the outlet pipe.

4. The system of claim 1, wherein a capacity of the first storage tank is smaller than a capacity of the second storage tank.

5. The system of claim 1, further comprising a second heat exchanger extending from the first storage tank to outside of the storage tank to cool the cooling water of the first storage tank.

6. The system of claim 5, further comprising an air inlet part provided on an outer surface of the storage tank to induce air to flow into the second heat exchanger.

7. The system of claim 6, wherein the air inlet part is disposed to surround the second heat exchanger and provided in a tube shape having an open top.

8. The system of claim 6, wherein the air inlet part is provided in a venturi tube shape having an open top.

9. A cooling water storage reservoir capable of passively cooling a nuclear reactor building, the cooling water tank comprising:

a storage tank storing cooling water;

a partition part arranged within the storage tank and dividing inside of the storage tank into a first storage tank and a second storage tank to separate the cooling water;

a first heat exchanger extending from the storage tank to the building and cooling the nuclear reactor building based on the cooling water and a unidirectional valve, provided on the partition part and allowing the cooling water of the second storage tank to flow into the first storage tank when the water level of the first storage tank is reduced; and wherein the first heat exchanger comprises an inlet pipe into which the cooling water is introduced from the second storage tank, an outlet pipe along which the cooling water provided from the inlet pipe returns back into the first storage tank; and a heat exchange unit disposed between the inlet pipe and the outlet pipe.

* * * * *